United States Patent
Kobayashi

[11] 4,050,784
[45] Sept. 27, 1977

[54] LIGHT BEAM COUPLER FOR AXIALLY DISCOINCIDENT OPTICAL FIBERS

[75] Inventor: Kohroh Kobayashi, Tokyo, Japan

[73] Assignee: Nippon Selfoc Company, Limited, Tokyo, Japan

[21] Appl. No.: 681,806

[22] Filed: Apr. 29, 1976

[30] Foreign Application Priority Data

Apr. 30, 1975 Japan .............................. 50-59291[U]

[51] Int. Cl.² ................................................. G02B 5/14
[52] U.S. Cl. ............................. 350/96 C; 350/175 GN
[58] Field of Search .......... 350/96 WG, 96 R, 96 BC, 350/96 B, 96 C, 96 GN, 175 GN; 250/199; 331/94.5 C

[56] References Cited

U.S. PATENT DOCUMENTS

| | | | |
|---|---|---|---|
| 3,297,875 | 1/1967 | Garwin et al. | 350/96 WG |
| 3,455,625 | 7/1969 | Brumley et al. | 350/96 C |
| 3,508,807 | 4/1970 | Mayer | 350/96 C |
| 3,894,789 | 7/1975 | Kobayashi | 350/96 C |
| 3,912,364 | 10/1975 | Hudson | 350/96 C |

*Primary Examiner*—John K. Corbin
*Assistant Examiner*—Rolf Hille
*Attorney, Agent, or Firm*—Hopgood, Calimafde, Kalil, Blaustein & Lieberman

[57] ABSTRACT

The invention contemplates an improved means for coupling plural optical fibers to a single optical fiber, whereby coupling losses may be held to relatively low magnitude. Each of the plural optical fibers is fitted to a first end of an elongate light-transmitting body having an elongate body axis about which the refractive index decreases approximately proportional to the square of the distance from the axis, and these bodies are grouped with their body axes is close and substantially parallel array. The opposite ends of the light-transmitting bodies all spaced from and face the end of the single optical fiber, with the optical axis of said single end aligned with the elongation of the group; and an optical lens is placed on the optical axis between the group and the single-fiber end, with the latter near the focal plane of the lens.

10 Claims, 6 Drawing Figures

LIGHT BEAM COUPLER FOR AXIALLY DISCOINCIDENT OPTICAL FIBERS

The present invention relates generally to an optical fiber communication system and, more particularly, to light beam couplers adapted to optically couple two separate optical fibers with one optical fiber.

Light communications through optical fibers have come to be recognized as one of the most important media to cope with the need for transmitting a rapidly increasing amount of information produced from human activities of today, but more practicable optical fiber transmission systems are needed. In optical fiber transmission, semiconductor lasers are considered optimum for use as the light source, in view of the fact that they are small in size and operate with fairly high efficiency. However, modulation rates of semiconductor lasers are limited to less than several hundred megabits, due to the serious distortion or the spiking of the output signal caused by relaxation oscillation of the modulated output. Besides, the electrical circuit for driving the semiconductor laser becomes unable to provide substantial output current at higher modulation rates, thus limiting attainment of steep modulation (from being attained and, hence it is); it is therefore desirable that the modulation rate in a semiconductor laser be held below several hundred megabits. One prior art method for increasing the modulation rate is the superposition technique, employing a plurality of semiconductor lasers. For example, a light output of 1.2 gigabits may be obtained by superposing three light outputs of 400 megabits; this can be comparatively easily realized with the laser-driving electrical circuit, as well as with the semiconductor laser. To bring this approach into practice, light beams from a plurality of light sources must be coupled to a single optical fiber. This can be done by the use of half-mirrors, which however halves the light energy. One solution to this problem is the method in which a plurality of semiconductor lasers differing in wavelength are used, and their output beams are coupled through wavelengthselective reflecting mirrors to a single optical fiber.

The center medium (or core) of an optical fiber through which the light beam is transmitted is very small (e.g., several tens of microns) in diameter. In practice, therefore, highly precise alignment is required, for efficient coupling of laser light to the optical fiber, even from a single semiconductor laser. Moreover, prior art techniques using half-mirrors or wavelengthselective reflecting mirrors for coupling laser beams to a single optical fiber are not efficient; they require a considerable length of time to set up an optical coupling system, and involve instability of operation over a long period.

It is therefore an object of the present invention to provide a light beam coupler capable of coupling, with ease and stability, light beams from a plurality of light sources to a single optical fiber.

According to one aspect of the invention, one individual optical fiber is connected to each of a plurality of semiconductor lasers, and the individual optical fibers are coupled to a single optical fiber by way of an optical system. This approach obviates the need for precise alignment before output laser beams are coupled to an optical fiber.

A number of methods have been proposed for stable coupling of the output light beam from a single semiconductor laser to a single optical fiber, for example as described in U.S. Pat. No. 3,894,789 (July 15, 1975). According to the present invention, however a plurality of optical fibers are coupled to a single optical fiber, through an optical system. The inventive approach makes it possible (a) to establish optimum coupling between individual semiconductor lasers and their respective optical fibers by alignment made independently for each coupling, (b) to install the semiconductor lasers at relatively arbitrary positions by virtue of flexibility of optical fibers, (c) to simplify production processes, (d) to operate them stably over a long period, and (e) to reduce maintenance effort.

For efficient use of a lens to couple two parallel optical fibers whose optical axes differ from each other, it is necessary not only to transform the output beam size to a desired value but also to modify the beam-incident angle and position. The greater the axial discoincidence or offset between the two optical fibers, the more difficult it will be to improve coupling efficiency. One prior art approach to this problem is has been to reduce the diameter of each piece of a bundle of optical fibers or to thin the output end thereof, in order to reduce the axial discoincidence or offset between the optical fibers. In this method, however, the beam size at the output end of each of the bundled optical fibers becomes smaller than is optimum for the coupling optical fiber. In addition, the use of a converging lens to correct for axial discoincidence of the incident beams introduces a further problem, in that an output beam of smaller than size optimum becomes too large in size for the coupling optical fiber at its input end, resulting in low coupling efficiency. The use of a converging lens whose focal length is very short will make it possible to correct both for beam size and for axial discoincidence, but with such an approach, the incident beam angle exceeds the beam-acceptance angle at the input end of the coupling optical fiber, making no substantial optical coupling possible.

It is therefore an object of the invention to provide another efficient light beam coupler capable of controlling the beam sizes, incident positions and angles of a plurality of axially discoincident light beams, to approximately optimum values for optical coupling.

In a light beam coupler of the invention for coupling axially discoincident optical fibers to one optical fiber, a small lens is disposed at the output end of each fiber of bundled optical fibers, to magnify the size of each output light beam. The magnified beam size at the output end of the small lens can readily be reduced to a suitable beam size by a conventional converging lens system. This demagnifying process reduces axial deviation at the input end of the coupling optical fiber. Thus highly efficient light coupling can be attained.

Further objects, features and advantages of the invention will become more apparent from the following description taken in conjunction with the accompanying drawings, in which.

Figure 4:
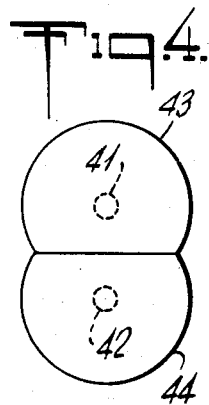
Figure 6:
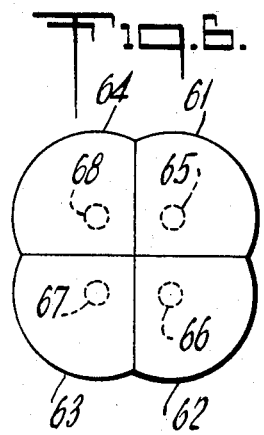
Figure 3:
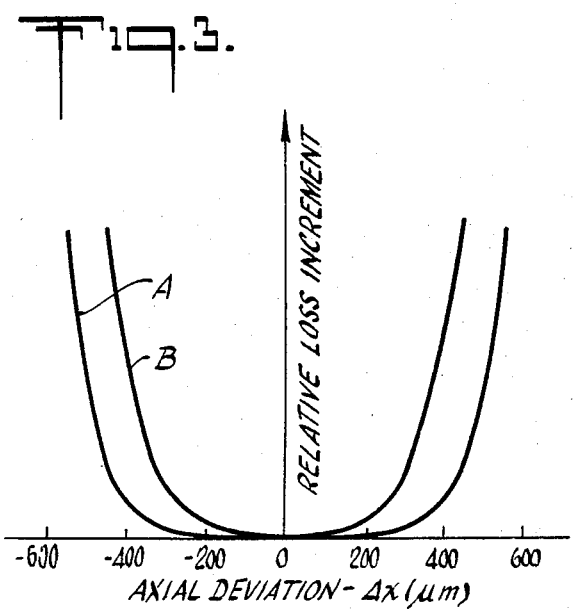
Figure 5:
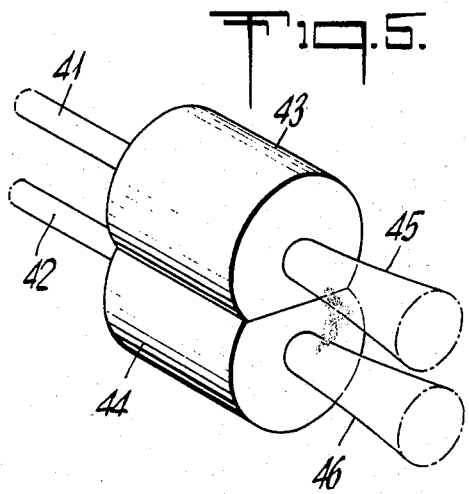

FIG. 3 is a graph showing results of experiments on coupling loss plotted against optical axis discoincidence, FIGS. 4 and 5 are simplified end and perspective views showing the construction of small lenses for optical coupling according to a second embodiment of the invention, and FIG. 6 is a similar end view of small lens construction for optical coupling according to a third embodiment of the invention.

Figure 1:
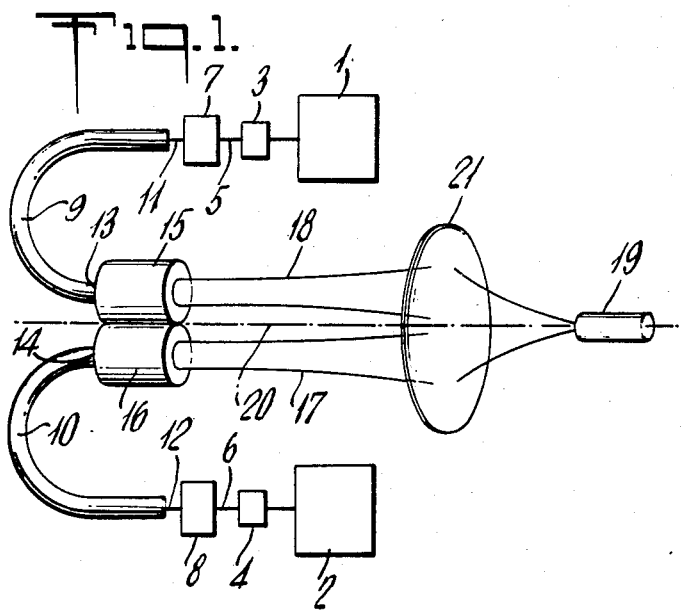
FIG. 1 is a perspective view showing a first embodiment of the invention.
Figure 2:
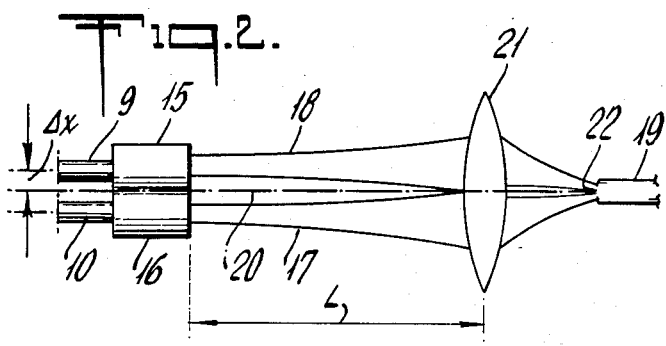
FIG. 2 is a side view showing part of the construction shown in FIG. 1.

A first embodiment of the invention is schematically shown in FIGS. 1 and 2, in which electrical circuits 1 and 2 drive semiconductor lasers 3 and 4, and the resultant output beams 5 and 6 are incident on input ends 11 and 12 of optical fibers 9 and 10 by way of optical systems 7 and 8, in the manner described in U.S. Pat. No. 3,894,789. The light beams propagated along the optical fibers 9 and 10 enter small lenses 15 and 16, being cylindrical light-converging bodies installed at output ends 13 and 14 of the optical fibers 9 and 10. The small lenses 15 and 16 have a refractive index distribution which decreases approximately proportional to the square of the distance from their respective central axes. Through these lenses, the beams 5 and 6 are magnified by a factor of ten and several power in terms of beam diameter. The resultant output beams 17 and 18 are nearly parallel to each other. The small lenses 15 and 16 are installed in contact with each other, with their tangential line coincident with the optical axis 20 of the optical fiber 19. The light beams 17 and 18 are converged through a convex lens 21 whose focal length is ten centimeters and several millimeters. The converged beams enter the core of a single optical fiber 19. The light converging transmission body used for the small lenses 15 and 16 can be manufactured according to British Pat. No. 1,266,521. When the diameter of each small lens is 400 microns, the axial deviation or offset Δ x from the optical axis 20 of the optical fiber 19 to the axis of the lens is 200 microns. When the beam size at the output end of the small lenses 15 and 16 is 140 microns, the ratio of the beam diameter to the axial deviation is about 2:3. In other words, the amount of axial deviation relative to the beam diameter is reduced. Thus, by converging the output beams through the lens 21, the axial discoincidence between the two beams at the input end of the optical fiber 19 can be made small relative to the core diameter of the optical fiber 19. Accordingly, the light beams 17 and 18 can be admitted into the core of the optical fiber 19 with a minimum of optical loss.

FIG. 3 is a graph showing coupling loss plotted against optical-axis deviation Δ x between optical fibers adapted to the optical coupler of the first embodiment of the invention, the data being plotted in terms of variations in output from the optical fiber 19 as one of the light beam output systems is displaced laterally i.e; for different offsets from the optical axis 20 of the optical fiber 19. In experiments, a converging type optical fiber having a core diameter of 30 microns was used for each of the optical fibers 9 and 19, and the input end of the optical fiber 19 was located near but behind the focal plane of a optical lens 21 of 15-mm focal length is 15 mm. As is apparent from FIG. 3, when the distance L between a small lens (15,16) and an optical lens 21 is 300 mm, the optical fiber 9 can be effectively coupled to the optical fiber 19 with a minimum of loss even if the optical fiber 9 is located at a 300 micron away offset Δ x away from the optical axis 20.

FIg. 4 is an end or cross-sectional view showing the arrangement of two small lenses each of which has a light converging transmission body, representing the second embodiment of the invention, and FIG. 5 is a perspective view of the construction shown in FIG. 4. The small lenses 43 and 44 which are fitted to optical fibers 41 and 42 respectively are bonded together; side by side, at contacting flat shavedoff portions. By this arrangement, the amount of axial discoincidence between the light beams 45 and 46 can be made smaller than that in the first embodiment of the invention. As in the first embodiment, the output light beam can be coupled to a single optical fiber (e.g., fiber 19) with high efficiency.

FIG. 6 schematically illustrates a third embodiment of the invention employing a cluster of four axially symmetrically located small lenses 61 to 64 of each having a body characterized by converging optical transmission. Lenses 61 to 64 are fitted to optical fibers 65 to 68 respectively. For axial symmetry, lenses 61 to 64 contact each other at flat shaved-off portions, there being two such flat sides on each of lenses 65 to 68.

It will be appreciated that the described embodiments obviate the need for combining a plurality of light beams via reflecting mirrors, with attendant wavelength selectivity. Hence, with the invention the wavelengths of the individual light sources may differ from each other or may be the same, thus markedly enhancing freedom in selection of light sources.

In FIG. 1, pulse signals of the same repetition but of differing phase may be applied from a signal source (not shown) to the respective semiconductor laser driving circuits 1 and 2 whereby a signal light beam of twice the repetition frequency can be propagated through the optical fiber 19. When the wavelengths of the output beams from the semiconductor lasers 3 and 4 are differentiated, these light beams can be separated from each other on the receiving side. Therefore input signals, independent of each other, can be applied to the semiconductor laser driving circuits 1 and 2 respectively.

For explanatory simplicity, major component elements are shown in FIG. 1. These component elements may be housed together in an enclosure, which will enable the device to operate with stability against environmental changes. In the first embodiment of the invention, the optical fibers 9, 10 and 19 may be of removable construction, e.g., connector construction. The optical fiber 9 may be fitted to the small lens 15 beforehand, to be removable from the lens 21. By this arrangement, it becomes possible to replace the semiconductor laser 3, the light coupler 7, the optical fiber 9 and the small lens 15 as one unit in the event of failure at semiconductor laser 3. This simplifies maintenance.

In the above embodiments, although plural optical fibers are installed symmetrically about an optical axis, they are not necessarily symmetrical; for example, the core of one of the optical fibers may be placed on the central optical axis 20, with the rest of them clustered around the central fiber. In this construction, the central fiber is used as the main transmission path, and the clustered outer fibers as the auxiliary transmission paths. A light-emitting diode may be used as the light source of the outer fibers because the transmission capacity of the auxiliary transmission path used as a monitor circuit or the like may be small and its loss is more tolerable.

In the above examples, the lens 21 is a single-element lens. However, it will be understood that a combined lens may be used in order to reduce aberration. Further, in FIG. 1, a reflecting mirror may be inserted between the small lenses 15, 16 and the lens 21 to reflect the light beams 16 and 17 and thereby fold the system whereby the distance between lenses, and thus the size of the device, can be reduced.

What is claimed is:

1. A light-beam coupler for optical fibers comprising; a group of elongate light-transmission bodies each having a generally central axis about which the refractive index decreases approximately proportional to the square of the distance from said axis, and each of said bodies being adapted to magnify the diameter and to limit axial deviation of a light beam entering at one axial end, said bodies being installed adjacent to each other with their said axes in closely spaced relation; a plurality of optical fibers each of which is coupled to a different one of said light-transmission bodies at one of the ends of said group; a single optical fiber having one end installed in spaced relation to the other end of said group and on an optical axis parallel to the axes of said light-transmission bodies, and an optical lens interposed between said group of light-transmission bodies and said single optical fiber; said end of said single optical fiber being disposed near the focal plane of said optical lens.

2. A light-beam coupler according to claim 1, in which said body axes are parallel.

3. A light-beam coupler according to claim 1, in which said bodies are generally cylindrical.

4. A light-beam coupler according to claim 1, in which said bodies are of substantially the same length and are grouped with their said axes in laterally spaced longitudinal register.

5. A light-beam coupler according to claim 3, in which said bodies are chordally truncated at flats parallel to said axes, said bodies being grouped in flat-to-flat adjacency.

6. A light-beam coupler according to claim 5, in which the number of bodies is two.

7. A light-beam coupler according to claim 5, in which the number of bodies is four, each body having flat truncations in perpendicular planes.

8. A light-beam coupler for optical fibers, comprising a cluster of plural like elongate lighttransmission bodies about a central optical axis, said bodies each having an elongate flat side fitted to a corresponding adjacent flat side of another body, the fit of said sides establishing a plane which includes said optical axis, each body having an elongate generally central axis parallel to said optical axis and about which central axis the refractive index decreases approximately proportional to the square of the distance from said central axis, and each of said bodies being adapted to magnify the diameter and to limit axial deviation of a light beam entering at one axial end; a separate optical fiber coupled to each body at one end of said group, a single optical fiber having an end on said optical axis in spaced relation to and facing the other end of said group, and an optical lens interposed between said group and said single optical fiber with said end of said single optical fiber near the focal plane of said lens.

9. A light-beam coupler for optical fibers, comprising a cluster of like elongate light-transmission bodies, each having an elongate body axis about which the refractive index decreases approximately proportional to the square of the distance from said axis, and each of said bodies being adapted to magnify the diameter and to limit axial deviation of a light beam entering at one axial end; said bodies being arranged in said cluster with said body axes in substantially parallel and closely spaced relation, a separate optical fiber coupled to each of a plurality of bodies at one end of said cluster, a single optical fiber having an end of an optical axis aligned with the elongation of said cluster, said end of said single optical fiber being in spaced relation to and facing the other end of said cluster, and an optical lens interposed between said cluster and said single optical fiber with said end of said single optical fiber near the focal plane of said lens.

10. A light-beam coupler for optical fibers, comprising a cluster of like elongate light-transmission bodies, each having an elongate body axis about which the refractive index decreases approximately proportional to the square of the distance from said axis, and each of said bodies being adapted to magnify the diameter and to limit axial deviation of a light beam entering at one axial end; said bodies being arranged in said cluster with said body axes in substantially parallel and closely spaced relation, a separate optical fiber coupled to each of a plurality of bodies at one end of said cluster, a single optical fiber having an end to be coupled to light from said cluster, and optical means including a lens mounted to receive light from the other end of said cluster and to focus the same at said end of said single optical fiber.

* * * * *